United States Patent Office 3,278,391
Patented Oct. 11, 1966

3,278,391
PROCESS FOR PRODUCING AN ENZYME SYSTEM CAPABLE OF DEGRADING PENICILLIN G TO 6-APA USING A QUATERNARY AMMONIUM HALIDE
Hans W. Ruelius, Wayne, Pa., assignor to American Home Products Corporation, New York, N.Y., a corporation of Delaware
No Drawing. Filed Feb. 27, 1963, Ser. No. 261,485
16 Claims. (Cl. 195—36)

This invention relates to the production of 6-aminopenicillanic acid and more particularly relates to an improved method of producing 6-aminopenicillanic acid from penicillin G.

The recovery in high yield and in an economic manner of products such as 6-aminopenicillanic acid from aqueous solutions of the same such as for example fermentation broths, has been a long standing problem.

In recovering 6-aminopenicillanic acid, a compound such as is described in U.S. 2,941,995, from penicillin G according to conventional practice one of the principal problems encountered is the effective separation of the bacterial cells from the growth medium as well as from the final aqueous solution from which the acid is recovered. According to the technique presently practiced, an organism such as for example Escherichia coli is maintained in a growth medium as a fine bacterial suspension. When such an organism is to be used in the production of 6-aminopenicillanic acid, bacterial cells containing the penicillin-splitting enzyme are separated from the growth medium by centrifuging. The cells are thereafter suspended in water to which a selected penicillin such as for example penicillin G is introduced. After conversion of the penicillin G to 6-aminopenicillanic acid by degradation, removal of the cells prior to recovery of the aminopenicillanic acid product is required. Due to the nature of the relatively stable cellular suspension, considerable difficulty is experienced when centrifuging or other separating techniques are applied to the growth medium or to the aminopenicillanic acid containing aqueous solution in which the bacteria are suspended. Inability of current processes to effectively separate the bacterial cells results in low purity and low yield of the final product. Attempts have been made to minimize these factors by the use of improved separating techniques. However, the results in terms of derived or expected product yield have not been completely satisfactory.

It is accordingly an object of the present invention to provide an improved process for removing bacterial cells from aqueous solution.

It is another object of the present invention to recover 6-aminopenicillanic acid from aqueous solutions in increased yields and higher purity.

It is a further object of the present invention to improve the degradation process by which 6-aminopenicillanic acid is obtained from penicillin G.

These and other objects and advantages are accomplished by the method of the present invention which in its broadest aspects is based on the discovery that certain specific flocculating agents can be added to bacteria growth media after final growth of the bacterial cells in the degradation of penicillin G to 6-aminopenicillanic acid. These particular agents have no adverse effect on the enzyme activity and provide an increase in yield and purity of the final 6-aminopenicillanic acid product. It has been further discovered that the effect of the flocculating agent on the cell is maintained through the conversion stage after which the cell suspension can conveniently and effectively be separated from the product solution by centrifuge. This results in a clear aqueous solution from which 6-aminopenicillanic acid can be recovered with no further treatment for solids removal prior to aminopenicillanic acid concentration.

The flocculating agents which we have found unexpectedly effective in accomplishing the foregoing are the quaternary ammonium salts preferably the quaternary ammonium halides. These compounds are normally added, according to the present invention, in small amounts to the final broth in which the desired cellular organisms are being grown and from which the cells so treated are removed by centrifuge. In the use of such compounds, it has been found that there is no appreciable loss of the amidase enzyme activity in the cell nor does the addition of such agents cause denaturization of the desire penicillin amidase as has occurred in previous attempts to improve separation by the addition of agents.

The reason for the unexpected effectiveness of these particular compounds is not clearly understood, though it is postulated that the particular agents may be effective in reducing the electrostatic repulsion of the bacterial cells thus making for a more definitive separation when the solution containing the suspension is subjected to separation procedures.

According to the process of the present invention, a selected organism to be used in the degradation of the penicillin G such as for example Alcaligenes faecalis or Escherichia coli is sustained in a growth medium as a bacterial suspension. When it is desired to use the selected enzyme system, the bacteria are transferred to a sterile medium and incubated at a temperature of from 20–35° C. and preferably at a temperature of from 25–27° C. for a period of 24 to 120 hours. The broth is then aseptically transferred to a fermentor containing a larger quantity of the sterile growth medium. Incubation is again carried out for a period of 20–30 hours at a temperature of from 20–35° C. under constant agitation and sufficient aeration to maintain dissolved oxygen at all times. This aeration may be conveniently accomplished by bubbling air or oxygen through the fermentation mixture. If a large quantity of the bacterial cells are desired, it may be desirable to again transfer the final broth as described to a larger fermentor containing the same media, sufficient in an amount for example so as to represent 7.5% inoculum. Fermentation is again carried out under the conditions previously described.

According to the method of the present invention, the final broth product is now pumped to a holding tank where the selected flocculating agent or blend of the same is added in an amount of from 0.01 to about 1.0% by weight of the total broth preferably in an amount of from 0.02 to 0.2% by weight. The flocculating agents found uniquely effective for this purpose are the quaternary ammonium salts and preferably as has been suggested the quaternary ammonium halides. Typical of the preferred quaternary ammonium halides suitable for purposes of the present invention are the following: hexadecyl pyridinium chloride, hexadecyltrimethyl ammonium chloride, hexadecyldimethyl benzyl ammonium chloride, [2-(2 - [-p,(1,1,3,3 -t etramethylbutyl)phenoxy]ethoxy) ethyl]dimethylbenzylammonium chloride and [2-(2-[p-(1,1,3,3 - tetramethylbutyl)cresoxy]ethoxy)ethyl]dimethylbenzylammonium chloride. While it has been found that a selected halide of the foregoing type will be most satisfactory, it has also been discovered that mixtures of the foregoing compounds can be used equally as well provided that total amount of agent added does not exceed the amount stated above. A typical mixture suitable for this purpose is dodecyldimethylbenzylammonium chloride, tetradecyldimethylbenzylammonium chloride and hexadecyldimethylbenzylammonium chloride in substantially equal amounts. After addition of the flocculating agent, the broth is agitated for a period of time varying from 10 to 60 minutes depending on the quantities of cells present. After agitation, the cells are allowed to settle and from 50 to 70% of the clear supernatant liquid is separated and discarded. The liquid remaining, containing the desired suspension of cells is then passed to centrifuging or other convenient separation means to effect their separation and recovery.

Preliminary to the actual production of 6-aminopenicillanic acid from penicillin G, the cells are resuspended in water in an amount equivalent to approximately 30 grams per liter of liquid wet weight. To this suspension from 1 to 3% of the selected penicillin such as potassium penicillin G is added and conversion permitted to proceed from 10–20 hours at a temperature of from 20–30° C. under agitation and at pH between about 8 and 9.

While the present invention has particular application to the conversion or degradation of penicillin G to produce 6-aminopenicillanic acid, it may be applied equally well to other penicillin degradation processes. The penicillin G referred to herein is the benzylpenicillin which may be available as the sodium or potassium salt.

Upon completion of conversion as evidenced by the determination of 6-aminopenicillanic acid, the contents of the vessel are centrifuged with recovery of a substantially clear centrifugate free of the fine suspension of bacterial cells. From the clear solution, phenylacetic acid is then removed by extraction with amyl acetate or an equivalent material. The extracted solution is concentrated to yield 6 aminopenicillanic acid from which the crystalline 6-aminopenicillanic acid can be obtained by acidifying with dilute nitric acid, filtering and drying.

It is in the latter steps of recovering or more specifically separating the fine bacterial suspension from the aqueous solution following conversion of the penicillin G to the 6-aminopenicillanic acid that the importance of the present invention is apparent. The ability to effectively separate the bacterial suspension from the product solution as is accomplished by the flocculating agents of this invention results in a higher yield and higher purity of the 6-aminopenicillanic acid than has been possible by conventional processes. It is also important to note that the specific flocculating agents of the present invention while permitting the recovery of a substantially clear solution of the desired aminopenicillanic acid, which requires no further processing contrary to prior technique, also does not adversely affect the enzyme system. This added advantage permits the resuspension and use of the bacterial cells in further conversion of selected penicillin to the 6 aminopenicillanic acid form.

The examples which follow will further illustrate the invention:

Example I

Stock cultures of *Alcaligenes faecalis* are grown on trypticase soy agar slants at pH 7.0 for 24 hours at 25° C. Ten milliliters of sterile water are aseptically transferred to the slant and the growth scraped into suspension. The 10 ml. of aqueous suspension of cells is transferred to a 4 liter aspirator bottle containing 2 liters of sterile medium consisting of 2.6% w./v., Wilson's Medo-Peptone paste in water, pH 7.0. This aspirator is incubated at 25° C. for 24 hours on a rotary shaker after which time it is aseptically transferred to a fermentor containing 190 gallons of like media. Incubation is again carried out for 24 hours at 25° C. under constant agitation and sufficient aeration to maintain dissolved oxygen at all times. At harvest, the final broth is pumped to a holding tank where a blend of approximately equal amounts of dimethylbenzyldodecyl ammonium chloride, dimethylbenzyltetradecyl ammonium chloride and dimethylbenzylhexadecyl ammonium chloride in a 50% aqueous solution is added to make a final concentration of .05 g./l. and agitated for fifteen minutes. The cells are allowed to settle and 50 to 70% of the resultant clear supernatant is discarded. The remaining mixed liquor is passed through a centrifuge and the cells recovered.

The cells are then resuspended at approximately 30 grams per liter, wet weight, in water. To this suspension, 1.5% potassium pencillin G is added. Conversion is allowed to proceed for 12 to 14 hours at 25° C. under agitation and with continuous addition of dilute sodium hydroxide to maintain pH between 8–9. Upon completion of conversion, the contents of the vessel are again centrifuged with the clear discharge being retained. Residual penicillin and phenylacetic acid are then extracted from the clear centrifuge discharge with amylacetate. This extracted solution is concentrated to yield a 6-APA (aminopenicillanic acid) of 40–50,000 mcg./ml. It is then acidified with dilute nitric acid at which time the 6-APA precipitates out and is finally filtered and dried.

Example II

Stock cultures of Wy 6100, *Escherichia coli*, are grown on Trypticase soy agar slants, at pH 7.0 24 hours at 25° C. Ten milliliter of sterile water are aseptically transferred to the slant and the growth scraped into suspension. The 10 ml. of aqueous suspension of cells is transferred to a 4 liter aspirator bottle containing 2 liters of sterile medium consisting of 2.6%, w./v., Wilson's Medo-Peptone paste and 0.10% potassium phenylacetate in water, pH 7.0. This aspirator is incubated at 24° C. for 24 hours on a rotary shaker after which time it is aseptically transferred to a fermentor containing 190 gallons of like media. Incubation is again performed for 24 hours at 25° C. under constant agitation and sufficient aeration to maintain dissolved oxygen at all times. At harvest, the final broth is pumped to a holding tank where 0.4% (wt.) of [2-(2-[p - (1,1,3,3 - tetramethylbutyl)phenoxy]ethoxy)ethyl]dimethylbenzylammonium chloride, monohydrate is added and agitated for fifteen minutes. The cells are then recovered by centrifugation.

The cells are resuspended at approximately 30 grams per liter, wet weight, in water. To this suspension, 1.5% potassium penicillin G is added. Conversion is allowed to proceed for 12 to 14 hours at 25° C. under agitation and with continuous addition of dilute sodium hydroxide to maintain pH between 8–9. Upon completion of conversion, the contents of the vessel are again centrifuged producing a clear centrifuge discharge which is retained for further processing. Residual penicillin and phenylacetic acid are extracted from the clear centrifuge discharge with amyl acetate. The aqueous solution is concetrated to yield at 6-APA potency of 40–50,000 mcg./ml. It is then acidified with dilute nitric acid at which time the 6-APA precipitates out and is finally filtered and dried.

Example III

Stock cultures of Wy 129, *Alcaligenes faecalis*, are grown on Trypticase soy agar slants at pH 7.3 for 18–24 hours at 28° C. Ten milliliters of sterile water is added aseptically to the slant and the growth is suspended. The aqueous suspension of the cells is transferred to a 2.8 liter Fernbach flask containing 500 milliliters of Trypticase soy broth, pH 7.3. The Fernbach flask is incubated at 28° C. for 24 hours on a rotary shaker rotating at 250 r.p.m. with a 1½ inch stroke. After that time 50 milliliter aliquots of the bacterial growth are transferred to 6 liter Erlenmeyer flasks, each containing 1 liter of Trypticase soy broth, pH 7.3. The Erlenmeyer flasks are incubated for 24 hours at 28° C. on a reciprocating shaker set for a 4 inch stroke and 83 strokes per minute.

At harvest, 3.2 ml. of a 2.33% aqueous solution of [2-(2 - [p - (1,1,3,3 - tetramethylbutyl)phenoxy]ethoxy)ethyl]dimethylbenzylammonium chloride, monohydrate is added with stirring to a 160 ml. aliquot of the final broth. After 10 minutes, the cells begin to settle by gravity. They are easily separated from the growth medium by centrifugation.

The collected cells are resuspended in 40 ml. of a 1% solution of potassium penicillin G in 0.01 M potassium phosphate buffer pH 7.7. Conversion to 6-aminopenicillanic acid is carried out for 16 hours at 28° C. on a rotary shaker. After that time the bacterial cells are separated by centrifugation or filtration. The desired 6-aminopenicillanic acid is recovered from the clear aqueous solution in the conventional manner.

*Example IV*

Cells of *Alcaligenes faecalis* are grown according to the method of Example III. At the end of the final growth period, the cells are harvested by centrifugation. The bacteria derived from 1 liter of final broth are resuspended in 250 ml. of 1% solution of potassium penicillin G in 0.01 M potassium phosphate buffer, pH 7.7. Conversion to 6-aminopenicillanic acid is carried out for 16 hours at 28° C. on a rotary shaker. At the end of this period, 5 ml. of a 2.33% aqueous solution of [2-(2-[p-1,1,3,3-tetramethylbutyl)phenoxy ] ethoxy)ethyl ] dimethylbenzylammonium chloride is added to the stirred conversion mixture. The cells which settle within 10 to 20 minutes after stirring is discontinued, are then removed by filtration or centrifugation. From the clarified liquid, 6-aminopenicillanic acid is isolated in the conventional manner.

As has been described, the use of specific flocculating agents of the present invention at the growth stage or conversion stage provides a more effective separation of the cells from the growth medium as well as the separation of the cells after conversion of the penicillin G to the desired 6-aminopenicillanic acid. This easier and more effective separation results in increased yield since the successive filtrations required by the prior art are no longer necessary. Additionally, as has been pointed out, there is no adverse effect on the enzyme used and no appreciable loss of the same during either the growth stage or the conversion stage of the process. These discoveries are most significant when consideration is given to the highly sensitive nature of the cellular bacteria used in accomplishing the desired degradation.

While the invention has been described with some degree of particularity in the specific examples provided, it must be recognized that the language used was for convenience of description and is not intended in any way to be construed as a limitation on the scope of the invention. The latter is to be limited only by the claims appended hereto in which the invention claimed is:

1. In the process of producing an enzyme system capable of degrading penicillin G to 6-aminopenicillanic acid wherein the enzyme for the degradation is obtained by the growth of bacterial organisms in a nutrient medium the improvement comprising flocculating the bacterial cells containing the enzyme at harvest from an aqueous suspension containing the same by adding to the aqueous suspension prior to addition of penicillin G, a quaternary ammonium halide without adversely affecting the enzyme and collecting the flocculated bacterial cells.

2. The process improvement as claimed in claim 1 wherein the quaternary ammonium halide is added to the bacterial growth medium in an amount of from 0.02% to 0.1% of the growth medium.

3. The process improvement as claimed in claim 2 wherein the quaternary ammonium halide is hexadecyltrimethylammonium chloride.

4. The process improvement as claimed in claim 2 wherein the quaternary ammonium halide is hexadecylpyridinium chloride.

5. The process improvement as claimed in claim 2 wherein the quaternary ammonium halide is hexadecyldimethylbenzylammonium chloride.

6. The process improvement as claimed in claim 2 wherein the quaternary ammonium halide is a blend of dodecyldimethylbenzylammonium chloride, tetradecyldimethylbenzylammonium chloride, and hexadecyldimethylbenzylammonium chloride in substantially equal amounts.

7. The process improvement as claimed in claim 2 wherein the quaternary ammonium halide is [2-(2-[p-(1,1,3,3 - tetramethylbutyl)phenoxy]ethoxy)ethyl]dimethylbenzylammonium chloride monohydrate.

8. The process improvement as claimed in claim 2 wherein the quaternary ammonium halide is [2-(2-[p-(1,1,3,3 - tetramethylbutyl)cresoxy]ethoxy)ethyl]dimethylbenzylammonium chloride.

9. In the process of producing 6-aminopenicillanic acid from penicillin G by means of an enzyme system which degrades the penicillin G to 6-aminopenicillanic acid, the improvement comprising flocculating the bacterial cells containing the enzyme at harvest from an aqueous suspension containing the same by adding to the aqueous suspension prior to addition of penicillin G a quaternary ammonium halide without adversely affecting the enzyme, collecting the flocculated cells, resuspending the flocculated cells, adding to the resuspended bacterial cells penicillin G so as to obtain degradation of the penicillin G to 6-aminopenicillanic acid, adding to the conversion mixture subsequent to the penicillin G degradation an additional amount of quaternary ammonium halide without adversely affecting the enzyme system and collecting the flocculated bacterial cells.

10. The process improvement as claimed in claim 9 wherein the quaternary ammonium halide is added to the conversion mixture in an amount of from 0.02% to 0.1% of the conversion mixture.

11. The process improvement as claimed in claim 10 wherein the quaternary ammonium halide is hexadecyltrimethylammonium chloride.

12. The process improvement as claimed in claim 10 wherein the quaternary ammonium halide is hexadecylpyridinium chloride.

13. The process improvement as claimed in claim 10 wherein the quaternary ammonium halide is hexadecyldimethylbenzylammonium chloride.

14. The process improvement as claimed in claim 10 wherein the quaternary ammonium halide is a blend of dodecyldimethylbenzylammonium chloride, tetradecyldimethylbenzylammonium chloride, and hexadecyldimethylbenzylammonium chloride in substantially equal amounts.

15. The process improvement as claimed in claim 10 wherein the quaternary ammonium halide is [2-(2-[p-(1,1,3,3 - tetramethylbutyl)phenoxy]ethoxy)ethyl]dimethylbenzylammonium chloride monohydrate.

16. The process improvement as claimed in claim 10 wherein the quaternary ammonium halide is [2-(2-[p-(1,1,3,3 - tetramethylbutyl)cresoxy]ethoxy)ethyl]dimethylbenzylammonium chloride.

References Cited by the Examiner

UNITED STATES PATENTS

| | | | |
|---|---|---|---|
| 2,951,788 | 9/1960 | Lo et al. | 260—567.6 |
| 3,014,845 | 12/1961 | Rolinson et al. | 195—36 |
| 3,055,827 | 9/1962 | Wiley | 210—53 |
| 3,193,556 | 7/1965 | Kolobielski | 260—567.6 |

OTHER REFERENCES

Schwartz et al.: Surface Active Agents, Interscience Pub., Inc., New York, 1949, pp. 151–156.

A. LOUIS MONACELL, *Primary Examiner.*

D. M. STEPHENS, *Assistant Examiner.*